United States Patent
Takei (10) Patent No.: US 10,574,106 B2
(45) Date of Patent: Feb. 25, 2020

(54) STATOR FOR ROTATING ELECTRIC MACHINE

(71) Applicant: DENSO CORPORATION, Kariya, Aichi-pref. (JP)

(72) Inventor: Toshihiro Takei, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 15/685,044

(22) Filed: Aug. 24, 2017

(65) Prior Publication Data

US 2018/0062472 A1 Mar. 1, 2018

(30) Foreign Application Priority Data

Aug. 24, 1999 (JP) .................................. 2016-163999

(51) Int. Cl.
*H02K 3/12* (2006.01)
*H02K 1/04* (2006.01)
*H02K 1/16* (2006.01)
*H02K 3/28* (2006.01)

(52) U.S. Cl.
CPC .................. *H02K 3/12* (2013.01); *H02K 1/04* (2013.01); *H02K 1/16* (2013.01); *H02K 3/28* (2013.01)

(58) Field of Classification Search
CPC .. H02K 3/12; H02K 3/28; H02K 1/04; H02K 1/16
See application file for complete search history.

(56) References Cited

U.S. PATENT DOCUMENTS

| 5,936,326 | A | 8/1999 | Umeda et al. |
| 6,177,747 | B1 | 1/2001 | Maeda et al. |
| 6,441,527 | B1 * | 8/2002 | Taji .......................... H02K 3/12 |
| | | | 310/201 |
| 6,604,272 | B1 | 8/2003 | Maeda et al. |
| 6,956,314 | B2 * | 10/2005 | Higashino ................ H02K 3/12 |
| | | | 310/189 |
| 7,386,931 | B2 * | 6/2008 | Neet ................... H02K 15/0478 |
| | | | 29/596 |
| 8,581,460 | B2 * | 11/2013 | Shinohara ................ H02K 3/12 |
| | | | 310/207 |
| 2002/0043886 | A1 | 4/2002 | Fujita et al. |
| 2003/0015932 | A1 * | 1/2003 | Oohashi .................... H02K 3/12 |
| | | | 310/201 |
| 2004/0021388 | A1 | 2/2004 | Wada et al. |

(Continued)

FOREIGN PATENT DOCUMENTS

JP         2011-120356 A         6/2011

*Primary Examiner* — Emily P Pham
(74) *Attorney, Agent, or Firm* — Oliff PLC (57) ABSTRACT

A stator for a rotating electric machine includes an annular stator core and a stator coil. The stator core has a plurality of slots arranged in a circumferential direction thereof. The stator coil is formed of a plurality of electric conductor segments mounted on the stator core. Each of the electric conductor segments has a pair of in-slot portions and a turn portion. Each of the pair of in-slot portions is inserted in a corresponding one of the slots of the stator core. The turn portion is located on one axial side of the stator core and connects the pair of in-slot portions. Moreover, for each of the electric conductor segments, at least one of the pair of in-slot portions of the electric conductor segment includes a protruding part that protrudes in the circumferential direction of the stator core.

7 Claims, 7 Drawing Sheets

(56) References Cited

U.S. PATENT DOCUMENTS

| | | | |
|---|---|---|---|
| 2004/0207283 A1* | 10/2004 | Oohashi | H02K 3/12 |
| | | | 310/207 |
| 2005/0168094 A1 | 8/2005 | Higashino et al. | |
| 2006/0006756 A1 | 1/2006 | Wada et al. | |
| 2014/0062248 A1 | 3/2014 | Kaneiwa et al. | |
| 2014/0292119 A1 | 10/2014 | Takahashi | |
| 2016/0065026 A1* | 3/2016 | Nakamura | H02K 3/38 |
| | | | 310/207 |
| 2016/0254718 A1* | 9/2016 | Watanabe | H02K 3/12 |
| | | | 310/208 |
| 2017/0133899 A1* | 5/2017 | Fukuda | H02K 1/16 |

* cited by examiner

STATOR FOR ROTATING ELECTRIC MACHINE

CROSS-REFERENCE TO RELATED APPLICATION

This application is based on and claims priority from Japanese Patent Application No. 2016-163999 filed on Aug. 24, 2016, the content of which is hereby incorporated by reference in its entirety into this application.

BACKGROUND

1. Technical Field

The present invention relates to stators for rotating electric machines that are used in, for example, motor vehicles as electric motors and electric generators.

2. Description of Related Art

There are known rotating electric machines that are used in motor vehicles as electric motors and electric generators. These rotating electric machines generally include a rotor that is rotatably provided and a stator that is arranged to radially face the rotor. The stator includes an annular (or a hollow cylindrical) stator core and a stator coil. The stator core has a plurality of slots arranged in a circumferential direction thereof. The stator coil is mounted on the stator core so as to be received in the slots of the stator core.

Moreover, there is also known a method of forming a stator coil by inserting a plurality of substantially U-shaped electric conductor segments into the slots of a stator core and joining each corresponding pair of distal ends of the electric conductor segments.

Furthermore, there is disclosed, for example in Japanese Patent No. JP3284981B2, a method of urging in-slot portions of the electric conductor segments radially inward or radially outward by means of springback of the electric conductor segments. More specifically, according to this method, each of the substantially U-shaped electric conductor segments is formed so that the radial width between two straight portions of the electric conductor segment is greater than the radial depth of the slots of the stator core. Consequently, after the two straight portions are respectively inserted in two different slots of the stator core to respectively constitute two in-slot portions of the electric conductor segment, the two in-slot portions are pressed by the springback of the electric conductor segment respectively against the radially inner side wall of one of the two slots and the radially outer side wall of the other of the two slots. As a result, openings of all the slots of the stator, which are formed to open on a radially inner surface of the stator core, are closed by the corresponding in-slot portions of the electric conductor segments, thereby preventing intrusion of foreign matter (such as water) into the slots of the stator core via the openings. Moreover, during operation of the rotating electric machine, vibration of distal ends of teeth of the stator core is suppressed, thereby suppressing magnetic noise generated in the rotating electric machine.

However, with the above method, in assembling the electric conductor segments to the stator core, the assemblability may be lowered due to the radial springback of the electric conductor segments and the insulation properties of the electric conductor segments may be lowered due to interference between the straight portions of the electric conductor segments. Moreover, the greater the radial springback of the electric conductor segments, the more remarkable these problems.

Furthermore, the circumferential width of each of the slots of the stator core is generally set to be greater than the circumferential width of each of the straight portions (or in-slot portions) of the electric conductor segments by a predetermined amount, so as to facilitate the insertion of the straight portions of the electric conductor segments into the corresponding slots of the stator core from one axial side of the stator core and prevent the insulation properties of the electric conductor segments from being lowered due to interference between the straight portions of the electric conductor segments and the circumferential side walls of the corresponding slots. However, in this case, during operation of the rotating electric machine, the in-slot portions of the electric conductor segments may move (or rattle) in the corresponding slots of the stator core, thereby generating noise in the stator.

SUMMARY

According to exemplary embodiments, there is provided a stator for a rotating electric machine. The stator includes an annular stator core and a stator coil. The stator core has a plurality of slots arranged in a circumferential direction thereof. The stator coil is formed of a plurality of electric conductor segments mounted on the stator core. Each of the electric conductor segments has a pair of in-slot portions and a turn portion. Each of the pair of in-slot portions is inserted in a corresponding one of the slots of the stator core. The turn portion is located on one axial side of the stator core and connects the pair of in-slot portions. Moreover, for each of the electric conductor segments, at least one of the pair of in-slot portions of the electric conductor segment includes a protruding part that protrudes in the circumferential direction of the stator core.

Consequently, with the protruding part, the at least one of the pair of in-slot portions of the electric conductor segment is held at a predetermined position in the corresponding slot of the stator core, thereby being restricted from moving in the corresponding slot. As a result, it becomes possible to suitably assemble the electric conductor segments to the stator core and reliably suppress noise from being generated in the stator during operation of the rotating electric machine.

In a first exemplary embodiment, the protruding part is formed as a bent part that is bent in the circumferential direction of the stator core.

Further, the stator core may be formed of a plurality of steel sheets that are laminated in an axial direction of the stator core. For each of the electric conductor segments, each of the pair of in-slot portions of the electric conductor segment may include one bent part that is bent in the circumferential direction of the stator core. The bent parts may be preferably respectively formed in the pair of in-slot portions symmetrically with respect to a centerline of the electric conductor segment which extends through a center of the turn portion of the electric conductor segment.

Alternatively, the electric conductor segments may include first and second types of electric conductor segments. For each of the in-slot portions of the electric conductor segments of the first type, the circumferential side to which the bent part formed in the in-slot portion of the electric conductor segment of the first type is bent may be preferably set to be opposite to the circumferential side to which the bent part formed in a corresponding one of the in-slot portions of the electric conductor segments of the second type is bent. For each corresponding pair of the in-slot portions of the electric conductor segments of the first and second types, the bent parts formed in the in-slot portions of the corresponding pair may be preferably located at the same position in the axial direction of the stator core.

In a second exemplary embodiment, the protruding part is formed by pressing a part of the in-slot portion of the electric conductor segment in a radial direction of the stator core and thereby flattening the part of the in-slot portion.

Moreover, in the stator according to the exemplary embodiments, before being assembled to the stator core, each of the electric conductor segments may be substantially U-shaped to have a pair of straight portions extending parallel to each other and the turn portion connecting ends of the pair of straight portions. The pair of straight portions have a length greater than an axial length of the stator core. Each of the pair of straight portions includes one of the pair of in-slot portions of the electric conductor segment and is twisted, on the opposite axial side of the stator core to the turn portion, to one side in the circumferential direction of the stator core to form an oblique part; the oblique part extends obliquely with respect to an axial end face of the stator core. In this case, it is preferable that for the at least one of the pair of in-slot portions of the electric conductor segment, the protruding part protrudes to the side in the circumferential direction to which the straight portion that includes the in-slot portion is twisted.

It is preferable that the slots of the stator core, in which the in-slot portions of the electric conductor segments are inserted, are filled with a filler. In each of the slots of the stator core, there may be inserted a given number of the in-slot portions of the electric conductor segments in alignment with each other in a radial direction of the stator core. Each of the electric conductor segments may be preferably configured so that a radially inward springback force is generated in one of the pair of in-slot portions of the electric conductor segment and a radially outward springback force is generated in the other of the pair of in-slot portions.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Exemplary embodiments and their modifications will be described hereinafter with reference to FIGS. 1-10. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 1:
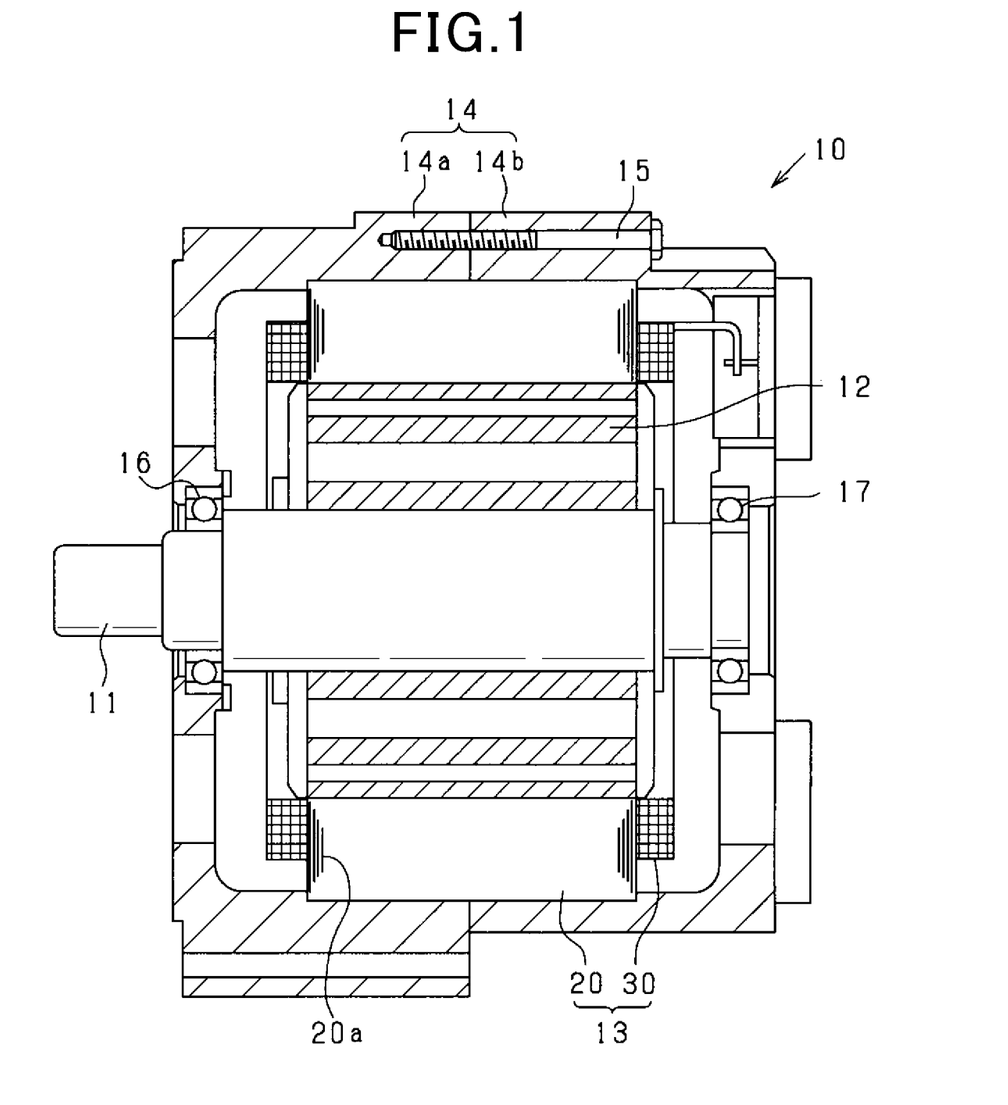
FIG. 1 is a partially cross-sectional view, taken along an axial direction, of a rotating electric machine which includes a stator according to a first embodiment.

FIG. 1 shows the overall configuration of a rotating electric machine 10 which includes a stator 13 according to a first embodiment.

In the present embodiment, the rotating electric machine 10 is configured as an automotive alternator for use in, for example, a passenger car or a truck.

As shown in FIG. 1, the rotating electric machine 10 includes a rotating shaft 11, a rotor 12 fixed on the rotating shaft 11, the stator 13 provided at such a position as to surround the rotor 12, and a housing 14 that receives both the rotor 12 and the stator 13.

The housing 14 has a substantially hollow cylindrical shape with both axial ends thereof closed. The housing 14 is comprised of a pair of cup-shaped housing pieces 14a and 14b. The housing pieces 14a and 14b are fastened, for example by bolts 15, into one piece with open ends thereof opposed to each other. The housing 14 has a pair of bearings 16 and 17 provided respectively in opposite axial end walls thereof.

The rotating shaft 11 is rotatably supported by the housing 14 via the pair of bearings 16 and 17.

The rotor 12 is fixedly fitted on an axially central part of the rotating shaft 11 so as to rotate together with the rotating shaft 11. The rotor 12 has a plurality of permanent magnets embedded therein. The permanent magnets form a plurality of magnetic poles on a radially outer periphery of the rotor 12 facing a radially inner periphery of the stator 13. The magnetic poles are spaced at predetermined intervals in a circumferential direction of the rotor 12 so that the polarities of the magnetic poles alternate between north and south in the circumferential direction. The number of the magnetic poles can be suitably set according to the design specification of the rotating electric machine 10. In the present embodiment, the number of the magnetic poles is set to, for example, eight (i.e., four north poles and four south poles).

The stator 13 includes an annular (or hollow cylindrical) stator core 20 disposed radially outside the rotor 12 and a three-phase stator coil 30 mounted on the stator core 20.

Figure 2:
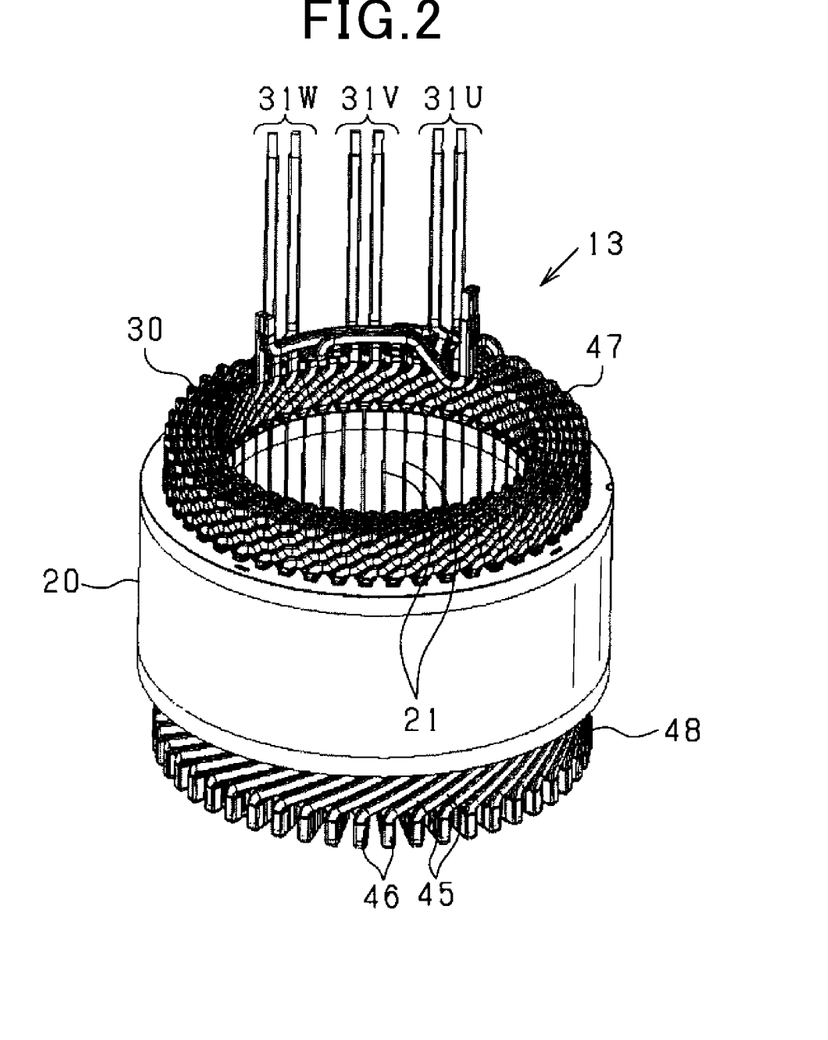
FIG. 2 is a perspective view of the stator according to the first embodiment.

Referring now to FIG. 2, the stator core 20 has a plurality of slots 21 arranged in a circumferential direction thereof. The stator coil 30 is comprised of a U-phase winding 31U, a V-phase winding 31V and a W-phase winding 31W that are distributedly wound in the slots 21 of the stator core 20.

In the present embodiment, the stator core 20 is formed by laminating a plurality of annular magnetic steel sheets 20a (see FIG. 1) in the axial direction of the stator core 20 and fixing them together by, for example, staking. It should be appreciated that other conventional metal sheets may also be used instead of the magnetic steel sheets.

Figure 3:
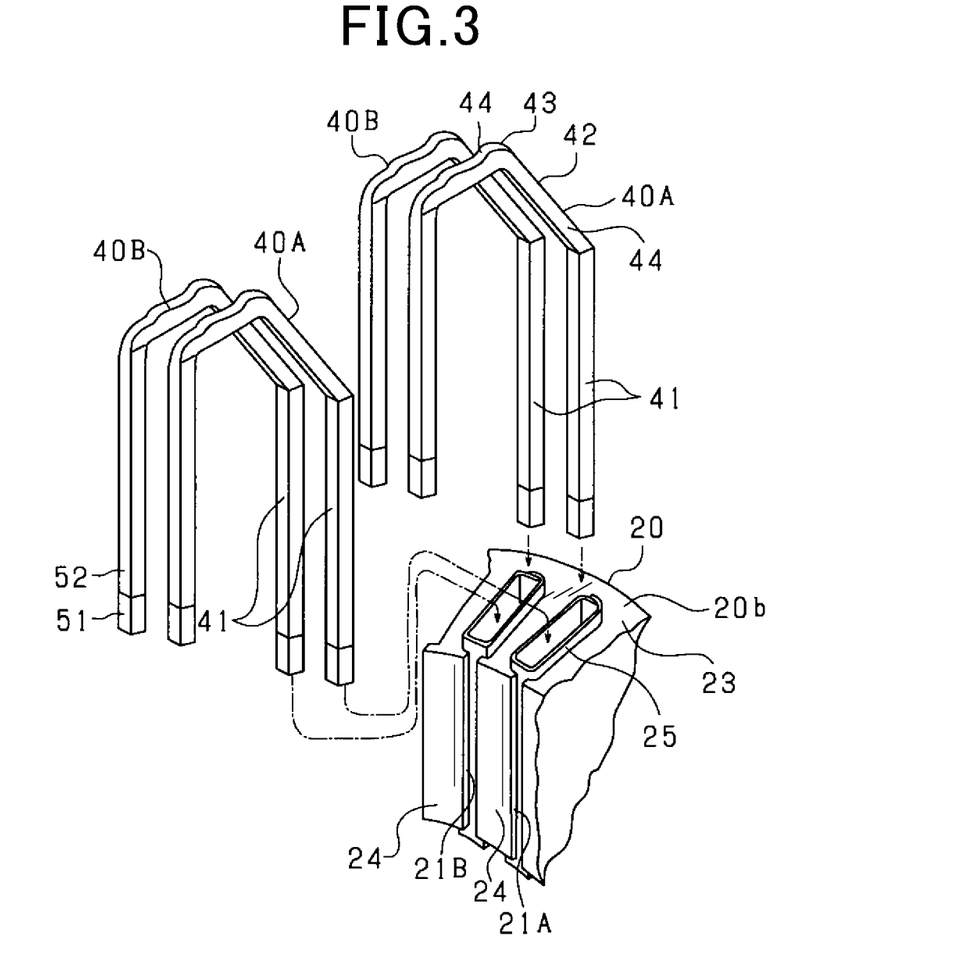
FIG. 3 is a schematic view illustrating the manner of inserting electric conductor segments forming a stator coil into slots of a stator core of the stator according to the first embodiment.

Moreover, as shown in FIG. 3, the stator core 20 includes an annular back core 23 and a plurality of teeth 24 in addition to the aforementioned slots 21. The teeth 24 each protrude radially inward from the back core 23 and are circumferentially spaced at a predetermined pitch. Each of the slots 21 is formed between one circumferentially-adjacent pair of the teeth 24. Accordingly, the slots 21 are circumferentially arranged at the same predetermined pitch as the teeth 24. In addition, each of the slots 21 extends in the axial direction of the stator core 20 to axially penetrate the stator core 20.

In the present embodiment, the number of the slots 21 per magnetic pole of the rotor 12 and per phase of the stator coil 30 is equal to 2. In other words, the slot multiplier number is equal to 2. Accordingly, the total number of the slots 21 formed in the stator core 20 is equal to 48 (i.e., 2×8×3). In addition, the forty-eight slots 21 are comprised of pairs of U-phase slots 21A and 21B, V-phase slots 21A and 21B and W-phase slots 21A and 21B which are sequentially and repeatedly arranged in the circumferential direction of the stator core 20.

In the present embodiment, each of the slots 21 is configured as a partially-closed slot which is partially closed at a radially inner end thereof. In other words, each of the slots 21 partially opens on the radially inner surface of the stator core 20. Moreover, each of the slots 21 is narrowed (i.e., reduced in circumferential width) in the vicinity of the radially inner end thereof. In addition, for each of the slots 21, the depth direction of the slot 21 coincides with a radial direction of the stator core 20.

It should be noted that each of the slots 21 may alternatively be configured as a closed slot which is completely closed at the radially inner end thereof.

In the present embodiment, the stator coil 30 is formed by first mounting a plurality of substantially U-shaped electric conductor segments 40 as shown in FIG. 3 to the stator core 20 and then joining each corresponding pair of distal ends of the electric conductor segments 40 by welding.

As shown in FIG. 3, each of the electric conductor segments 40 is substantially U-shaped to have a pair of straight portions 41 extending parallel to each other and a turn portion 42 connecting ends of the straight portions 41 on the same side. The straight portions 41 have a length greater than the axial length of the stator core 20. The turn portion 42 has an apex part 43 formed at the center of the turn portion 42 so as to extend parallel to a corresponding one of axial end faces 20b of the stator core 20. The turn portion 42 also has a pair of oblique parts 44 formed respectively on opposite sides of the apex part 43 so as to extend obliquely at a predetermined angle with respect to the corresponding axial end face 20b of the stator core 20. In addition, the stator 13 further includes insulators 25 that are respectively arranged in the slots 21 of the stator core 20 to electrically insulate the stator coil 30 (or the electric conductor segments 40) from the stator core 20.

It should be noted that for the sake of simplicity, bent parts 61 of the electric conductor segments 40, which will be described later, are not depicted in FIG. 3.

In the present embodiment, the electric conductor segments 40 are obtained by cutting and plastically deforming an electric wire that includes an electric conductor 51 and an insulating coat 52. The electric conductor 51 is formed of an electrically conductive material (e.g., copper) and has a substantially rectangular cross section. The insulating coat 52 is formed of an electrically insulative resin and provided to cover the outer surface of the electric conductor 51.

In addition, as shown in FIG. 3, the insulating coat 52 is removed from distal end parts of the straight portions 41 of the electric conductor segments 40 (i.e., end parts of the straight portions 41 on the opposite side to the turn portions 42). Consequently, the electric conductor 51 is exposed from the insulating coat 52 at the distal end parts of the straight portions 41 of the electric conductor segments 40.

In the present embodiment, the width of each of the straight portions 41 of the electric conductor segments 40 in a direction, which coincides with the circumferential direction of the stator core 20 upon insertion of the straight portions 41 of the electric conductor segments 40 into the corresponding slots 21 of the stator core 20, is set to be smaller than the circumferential width of each of the slots 21 of the stator core 20.

As mentioned previously, in the present embodiment, the slots 21 of the stator core 20 are comprised of a plurality of slot pairs each consisting of a first slot 21A and a second slot 21B; the first and second slots 21A and 21B are circumferentially adjacent to each other and belong to the same phase (i.e., the same one of the U, V, and W phases). On the other hand, the electric conductor segments 40 forming the stator coil 30 are comprised of a plurality of electric conductor segment pairs each consisting of a first electric conductor segment 40A and a second electric conductor segment 40B; the first and second electric conductor segments 40A and 40B have the same shape and size.

For each electric conductor segment pair, the straight portions 41 of the first electric conductor segment 40A are inserted, from a first axial side (i.e., the upper side in FIG. 3) of the stator core 20, respectively into the first slot 21A of a first slot pair and the first slot 21A of a second slot pair; the straight portions 41 of the second electric conductor segment 40B are inserted, from the first axial side of the stator core 20, respectively into the second slot 21B of the first slot pair and the second slot 21B of the second slot pair. That is, the first and second electric conductor segments 40A and 40B are circumferentially offset from each other by one slot pitch. In addition, the first slot pair and the second slot pair are apart from each other by one magnetic pole pitch (or six slot-pitches).

For example, in the case of the electric conductor segment pair which is shown on the upper right side in FIG. 3, the first electric conductor segment 40A has its right straight portion 41 inserted in the eighth layer (i.e., the radially outermost layer) of the first slot 21A shown in FIG. 3 and its left straight portion 41 inserted in the seventh layer of the first slot 21A (not shown) that is apart from the first slot 21A shown in FIG. 3 counterclockwise by one magnetic pole pitch. On the other hand, the second electric conductor segment 40B has its right straight portion 41 inserted in the eighth layer of the second slot 21B shown in FIG. 3 and its left straight portion 41 inserted in the seventh layer of the second slot 21B (not shown) that is apart from the second slot 21B shown in FIG. 3 counterclockwise by one magnetic pole pitch.

Figure 4:
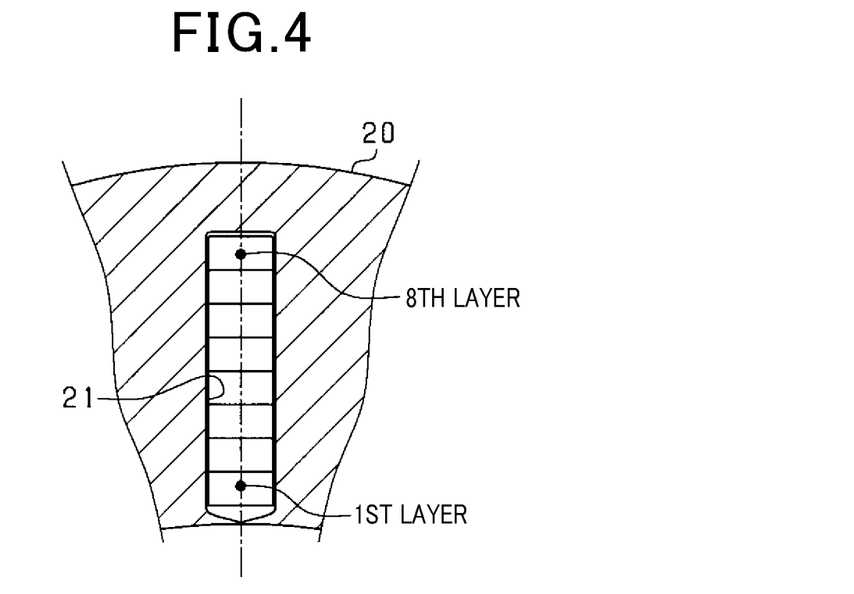
FIG. 4 is a cross-sectional view of part of the stator according to the first embodiment.

In the above manner, in each of the slots 21 of the stator core 20, there are inserted an even number of the straight portions 41 of the electric conductor segments 40. More particularly, in the present embodiment, as shown in FIG. 4, in each of the slots 21 of the stator core 20, there are inserted eight straight portions 41 of the electric conductor segments 40 so as to be radially stacked in eight layers in the slot 21.

After the insertion of the straight portions 41 of the electric conductor segments 40 into the corresponding slots 21 of the stator core 20, for each of the electric conductor segments 40, protruding parts of the straight portions 41 of the electric conductor segment 40, which protrude outside of the corresponding slots 21 on a second axial side (i.e., the lower side in FIG. 3) of the stator core 20, are twisted respectively toward opposite sides in the circumferential direction of the stator core 20 so as to extend obliquely at a predetermined angle with respect to the corresponding axial end face 20b of the stator core 20. Consequently, each of the protruding parts of the straight portions 41 is transformed into an oblique part 45 of the electric conductor segment 40; the oblique part 45 extends in the circumferential direction of the stator core 20 for substantially half a magnetic pole pitch (see FIG. 2).

Then, on the second axial side of the stator core 20, each corresponding pair of the oblique parts 45 of the electric conductor segments 40 are joined (e.g., by welding) at their respective distal ends, forming a joint (or weld) 46 therebetween (see FIG. 2). Consequently, all the electric conductor segments 40 are electrically connected in a predetermined pattern, thereby forming the stator coil 30.

More particularly, in the present embodiment, for each of the electric conductor segments 40, the straight portions 41 of the electric conductor segment 40 are inserted in the corresponding slots 21 of the stator core 20 so as to be respectively located at the mth and (m+1)th layers, where m is a natural number greater than or equal to 1 and less than or equal to 7. Consequently, the straight portions 41 of the electric conductor segment 40 respectively make up two in-slot portions A1 (see FIGS. 6 and 7) of the electric conductor segment 40 which are respectively received at the mth and (m+1)th layers in the corresponding slots 21 of the stator core 20. Moreover, the oblique parts 45 of the electric conductor segment 40 are also respectively located at the mth and (m+1)th layers. Furthermore, for each corresponding pair of the oblique parts 45 of the electric conductor segments 40, the two oblique parts 45 of the pair are respectively located at the mth and (m+1)th layers and joined to each other.

In the present embodiment, each of the U-phase, V-phase and W-phase windings 31U, 31V and 31W of the stator coil 30 is formed by electrically connecting a predetermined umber of the electric conductor segments 40 in series with one another. Consequently, each of the U-phase, V-phase and W-phase windings 31U, 31V and 31W of the stator coil 30 is wave-wound around the stator core 20 by, for example, eight turns (or eight circle rounds) in the circumferential direction of the stator core 20. Moreover, the U-phase, V-phase and W-phase windings 31U, 31V and 31W of the stator coil 30 are star-connected with each other.

Referring back to FIG. 2, the stator coil 30 mounted on the stator core 20 has an annular first coil end part 47 on the first axial side (i.e., the upper side in FIG. 2) of the stator core 20 and an annular second coil end part 48 on the second axial side (i.e., the lower side in FIG. 2) of the stator core 20. The first coil end part 47 is constituted of the turn portions 42 of the electric conductor segments 40 which protrude from the corresponding (i.e., the first) axial end face 20b of the stator core 20. The second coil end part 48 is constituted of the oblique parts 45 of the electric conductor segments 40, which protrude from the corresponding (i.e., the second) axial end face 20b of the stator core 20, and the joints 46 formed between the oblique parts 45.

In addition, at the first coil end part 47, the electrical connection between the in-slot portions A1 of the electric conductor segments 40 is made by the turn portions 42 at a six-slot pitch. On the other hand, at the second coil end part 48, the electrical connection between the in-slot portions A1 of the electric conductor segments 40 is made by the oblique parts 45 and the joints 46 at a six-slot pitch.

In the present embodiment, each of the electric conductor segments 40 is configured to generate a circumferential springback force in the straight portions 41 thereof, thereby suppressing movement of the straight portions 41 in the corresponding slots 21 of the stator core 20. Hereinafter, the configuration of the electric conductor segments 40 according to the present embodiment will be described in detail with reference to FIGS. 5-7.

Figure 5:
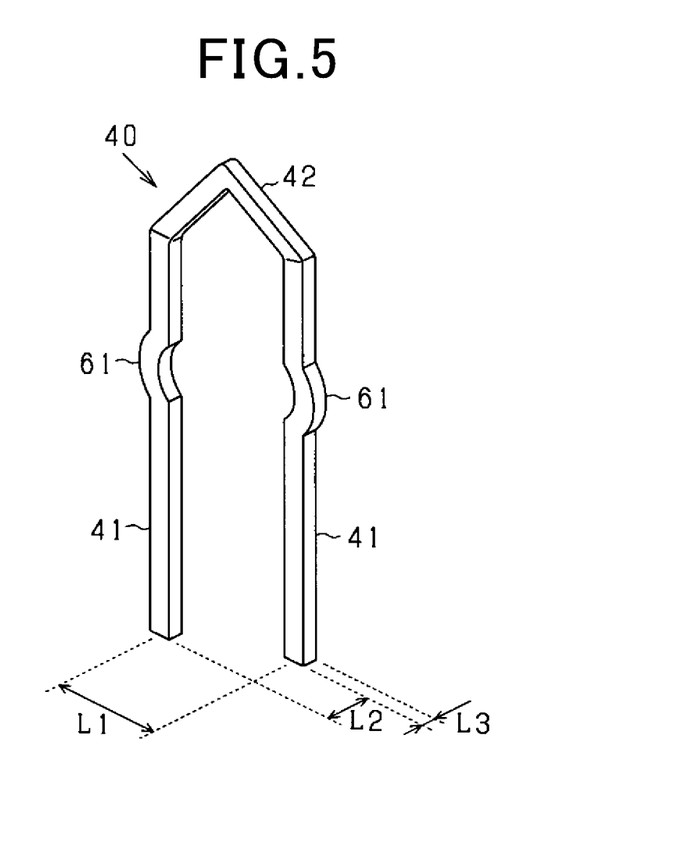
FIG. 5 is a perspective view of one of the electric conductor segments according to the first embodiment.
Figure 6:
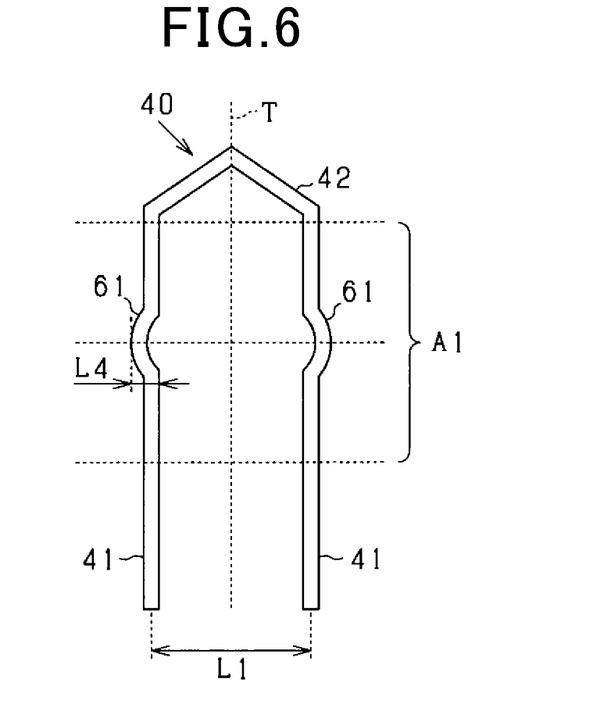
FIG. 6 is a plan view of the electric conductor segment shown in FIG. 5.

In the present embodiment, for each of the electric conductor segments 40, in a natural state before being inserted in the corresponding slots 21 of the stator core 20, the straight portions 41 of the electric conductor segment 40 extend parallel to each other and are spaced from each other by a spacing distance L1 in plan view (see FIG. 6). Here, the spacing distance L1 is defined as the distance between the central axes of the straight portions 41 in plan view. Moreover, by twisting the turn portion 42 of the electric conductor segment 40, the straight portions 41 are offset from each other by an offset distance L2 (see FIG. 5) in a direction perpendicular to both the extending direction (or longitudinal direction) of the straight portions 41 and the direction of the spacing distance L1 (or the direction in which the spacing distance L1 is defined). In addition, the offset distance L2 is set to be greater than the thickness L3 (see FIG. 5) of the straight portions 41 in the direction of the offset distance L2 (or the direction in which the offset distance L2 is defined).

With the straight portions 41 offset from each other by the offset distance L2, a radial springback force is generated in each of the electric conductor segments 40 in a state where an even number (e.g., eight in the present embodiment) of the straight portions 41 of the electric conductor segments 40 are inserted in radial alignment with each other in each of the slots 21 of the stator core 20 as shown in FIG. 4.

Moreover, in the present embodiment, each of the straight portions 41 of the electric conductor segments 40 has a bent part 61 that is bent in the circumferential direction of the stator core 20. More specifically, the bent part 61 is formed by plastically deforming the straight portion 41 so as to be curved at a given curvature. When the bent part 61 is pressed inward at the apex thereof, an elastic force (or springback force) is generated in the bent part 61.

For each of the electric conductor segments 40, the bent parts 61 formed in the straight portions 41 of the electric conductor segment 40 are located at the same position in the axial direction of the stator core 20 (or the longitudinal direction of the straight portions 41) and protrude respectively toward opposite sides in the circumferential direction of the stator core 20 (or the direction of the spacing distance L1).

More particularly, in the present embodiment, as shown in FIG. 6, the bent parts 61 are respectively formed in the straight portions 41 so as to protrude circumferentially outward of the substantially U-shaped electric conductor segment 40. Moreover, the bent parts 61 are formed symmetrically with respect to the centerline T of the electric conductor segment 40 which extends through the center of the turn portion 42 of the electric conductor segment 40.

In the present embodiment, as shown in FIG. 6, the position of the bent parts 61 in the axial direction of the stator core 20 is set to the central position of those parts A1 of the straight portions 41 of the electric conductor segment 40 which are received in the corresponding slots 21 of the stator core 20 (i.e., the in-slot portions A1 of the electric conductor segment 40). However, it should be noted that the position of the bent parts 61 may be offset from the central position of the in-slot portions A1 either toward or away from the turn portion 42 of the electric conductor segment 40 in the axial direction of the stator core 20. In any cases, it is necessary for the bent parts 61 to be formed in the in-slot portions A1 of the electric conductor segment 40.

Moreover, in the present embodiment, as shown in FIG. 6, for each of the bent parts 61, the width L4 of the bent part 61 in the circumferential direction of the stator core 20 (or the protruding direction of the bent part 61) is set to be greater than the opening width of the corresponding slot 21 in the circumferential direction (i.e., the circumferential width of the corresponding slot 21 minus the circumferential thickness of the insulator 25 arranged in the corresponding slot 21). Here, the width L4 is defined as the circumferential distance between a flat side surface of the straight portion 41, which is on the inside of the substantially U-shape of the electric conductor segment 40, and an imaginary line that extends in the axial direction of the stator core 20 though the apex of the bent part 61.

Setting the width L4 as above, it is possible to reliably cause the springback force to be generated in each of the bent parts 61 in the corresponding slots 21 of the stator core 20.

In addition, for each of the electric conductor segments 40, the distance between the distal end parts of the straight portions 41 of the electric conductor segment 40 before the insertion of the straight portions 41 into the corresponding slots 21 (or the spacing distance L1 shown in FIG. 5) is set to an integer multiple of one slot pitch, more particularly to six slot-pitches in the present embodiment. Consequently, in assembling the electric conductor segments 40 to the stator core 20, it is possible to prevent the assemblability from being lowered due to the bent parts 61 formed in the straight portions 41 of the electric conductor segments 40.

In the present embodiment, as described previously, for each of the electric conductor segments 40, the bent parts 61 are formed in the straight portions 41 of the electric conductor segment 40 so as to protrude respectively toward opposite sides in the circumferential direction of the stator core 20 (see FIG. 6). Consequently, the springback forces (or pressing forces) generated in the bent parts 61 are applied to the stator core 20 respectively in opposite circumferential directions (i.e., the left and right directions in FIG. 6). As a result, though the springback forces generated in the bent parts 61 are applied to only some of the magnetic steel sheets 20*a* that are axially laminated to form the stator core 20, it is still possible to prevent occurrence of misalignment between the magnetic steel sheets 20*a*.

Figure 7:
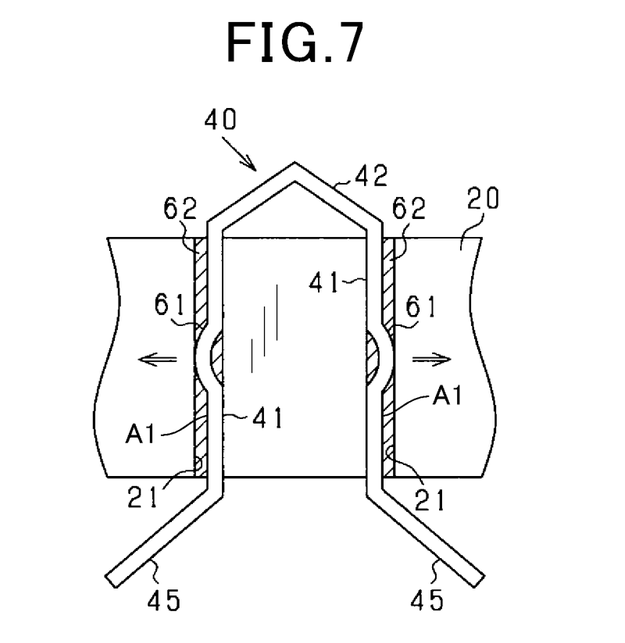
FIG. 7 is a schematic view illustrating the electric conductor segment shown in FIG. 5 in a state of having been inserted in the slots of the stator core.

In the present embodiment, as shown in FIG. 7, for each of the electric conductor segments 40, the straight portions 41 of the electric conductor segment 40 are circumferentially twisted, on the opposite axial side of the stator core 20 to the turn portion 42, to form the oblique parts 45. More specifically, the oblique parts 45 are formed to extend circumferentially outward of the substantially U-shape of the electric conductor segment 40 (or extend in the circumferential direction away from the centerline T of the substantially U-shaped electric conductor segment 40). Moreover, for each of the straight portions 41, the bent part 61 formed in the straight portion 41 protrudes to the circumferential side to which the straight portion 41 is twisted.

With the bent parts 61 formed therein, the in-slot portions A1 of the electric conductor segments 40 are held at predetermined positions in the corresponding slots 21 of the stator core 20. More particularly, in the present embodiment, for each of the electric conductor segments 40, the bent parts 61 are formed in the in-slot portions A1 of the electric conductor segment 40 so as to protrude circumferentially outward of the substantially U-shape of the electric conductor segment 40 (or protrude in the circumferential direction away from the centerline T of the substantially U-shaped electric conductor segment 40). Consequently, each of the in-slot portions A1 is held in the corresponding slot 21 of the stator core 20 such that the flat side surface of the in-slot portion A1, which is on the inside of the substantially U-shape of the electric conductor segment 40, is pressed against a circumferential side wall of the corresponding slot 21. That is, each of the straight portions 41 (or the in-slot portions A1) is circumferentially offset, by the bent part 61 formed therein, to the opposite circumferential side to the bent part 61. Consequently, in twisting the straight portion 41 to form the oblique part 45, it is possible to prevent the straight portion 41 from making contact with a corner portion of the stator core 20; the corner portion is on the second axial side of the stator core 20 and on the circumferential side of the straight portion 41 to which the straight portion 41 is twisted.

Moreover, in the present embodiment, after the insertion of the straight portions 41 of the electric conductor segments 40 into the corresponding slots 21 of the stator core 20, a filler 62 (see FIG. 7) is filled into the corresponding slots 21. The filler 62 may be formed of a synthetic resin, such as an epoxy resin, a urethane resin or a polyester.

As described, in the present embodiment, the electric conductor segments 40 are configured as shown in FIGS. 5-7. However, the configuration of the electric conductor segments 40 may be modified in various ways.

Figure 8A:
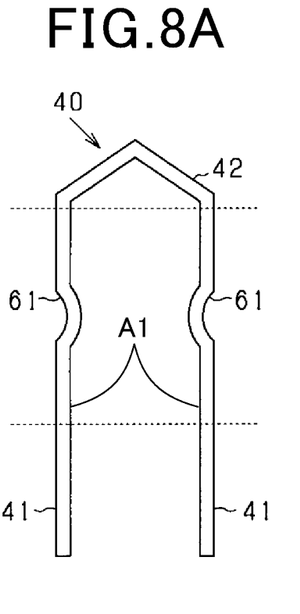
FIG. 8A is a plan view of one of electric conductor segments according to a first modification.

For example, FIG. 8A shows the configuration of electric conductor segments 40 according to a first modification. In this modification, for each of the electric conductor segments 40, the bent parts 61 are formed in the straight portions 41 of the electric conductor segment 40 so as to protrude circumferentially inward of the substantially U-shaped electric conductor segment 40.

Figure 8B:
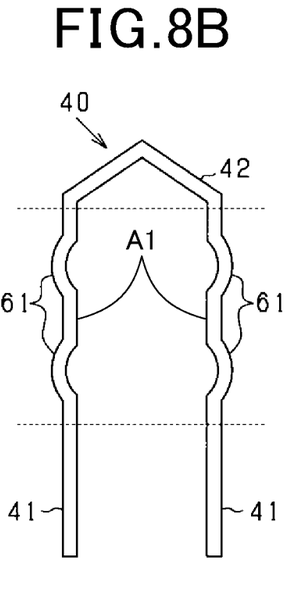
FIG. 8B is a plan view of one of electric conductor segments according to a second modification.

FIG. 8B shows the configuration of electric conductor segments 40 according to a second modification. In this modification, for each of the electric conductor segments 40, there are formed a pair of first and second bent parts 61 in each of the straight portions 41 of the electric conductor segment 40. The first bent parts 61 are formed at the same position in the axial direction of the stator core 20 in the respective straight portions 41. The second bent parts 61 are also formed at the same position in the axial direction of the stator core 20 in the respective straight portions 41. Moreover, the first bent parts 61 are spaced from the second bent parts 61 in the axial direction of the stator core 20 by a predetermined distance. Furthermore, all of the first and second bent parts 61 protrude circumferentially outward of the substantially U-shaped electric conductor segment 40.

Figure 8C:
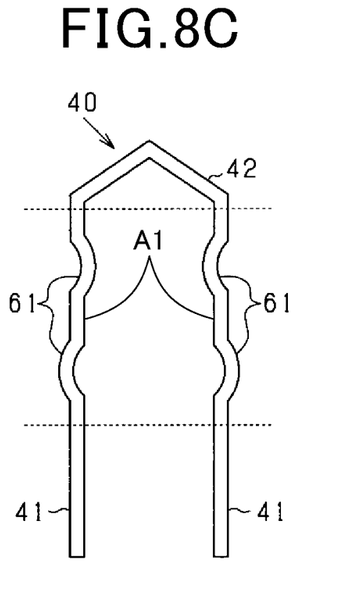
FIG. 8C is a plan view of one of electric conductor segments according to a third modification.

FIG. 8C shows the configuration of electric conductor segments 40 according to a third modification. In this modification, for each of the electric conductor segments 40, there are formed a pair of first and second bent parts 61 in each of the straight portions 41 of the electric conductor segment 40. The first bent parts 61 are formed at the same position in the axial direction of the stator core 20 in the respective straight portions 41. The second bent parts 61 are also formed at the same position in the axial direction of the stator core 20 in the respective straight portions 41. Moreover, the first bent parts 61 are spaced from the second bent parts 61 in the axial direction of the stator core 20 by a predetermined distance. Furthermore, the first bent parts 61 protrude circumferentially inward of the substantially U-shaped electric conductor segment 40 while the second bent parts 61 protrude circumferentially outward of the substantially U-shaped electric conductor segment 40. In addition, in this modification, for each of the straight portions 41, the circumferential distance between first and second imaginary lines is set to be greater than the opening width of the corresponding slot 21 in the circumferential direction of the stator core 20 (i.e., the circumferential width of the corresponding slot 21 minus the circumferential thickness of the insulator 25 arranged in the corresponding slot 21). Here, the first imaginary line extends in the axial direction of the stator core 20 though the apex of the first bent part 61 formed in the straight portion 41; the second imaginary line extends in the axial direction of the stator core 20 though the apex of the second bent part 61 formed in the straight portion 41.

According to the present embodiment, it is possible to achieve the following advantageous effects.

In the present embodiment, the stator 13 includes the annular stator core 20 and the stator coil 30. The stator core 20 has the slots 21 arranged in the circumferential direction thereof. The stator coil 30 is formed of the electric conductor segments 40 mounted on the stator core 20. Each of the electric conductor segments 40 has the pair of in-slot portions A1 (see FIG. 6) and the turn portion 42. Each of the pair of in-slot portions A1 is inserted in the corresponding slot 21 of the stator core 20. The turn portion 42 is located on the first axial side (i.e., the upper side in FIGS. 6 and 7) of the stator core 20 and connects the pair of in-slot portions A1. Moreover, each of the pair of in-slot portions A1 includes the bent part (or protruding part) 61 that is bent (or protrudes) in the circumferential direction of the stator core 20.

Consequently, with the bent parts 61 formed therein, the in-slot portions A1 of the electric conductor segments 40 are held at the predetermined positions in the corresponding slots 21 of the stator core 20, thereby being restricted from moving in the corresponding slots 21. As a result, it becomes possible to suitably assemble the electric conductor segments 40 (or the stator coil 30) to the stator core 20 and reliably suppress noise from being generated in the stator 13 during operation of the rotating electric machine 10 due to movement (or rattle) of the in-slot portions A1 of the electric conductor segments 40 in the corresponding slots 21 of the stator core 20.

Moreover, the bent parts (or protruding parts) 61 formed in the in-slot portions A1 of the electric conductor segments 40 are bent (or protrude) in the circumferential direction, not in the radial direction of the stator core 20. Consequently, though there are formed the bent parts 61 in the in-slot portions A1 (or the straight portions 41) of the electric conductor segments 40, it is still possible to insert an even number (e.g., eight in the present embodiment) of the in-slot portions A1 of the electric conductor segments 40 in each of the slots 21 of the stator core 20 in radial alignment with each other.

In the present embodiment, the stator core 20 is formed of the magnetic steel sheets 20a that are laminated in the axial direction of the stator core 20. For each of the electric conductor segments 40, the bent parts (or protruding parts) 61 are respectively formed in the pair of in-slot portions A1 of the electric conductor segment 40 symmetrically with respect to the centerline T of the electric conductor segment 40 which extends through the center of the turn portion 42 of the electric conductor segment 40 (see FIG. 6).

With the above symmetrical formation, the bent parts 61 are located at the same position in the axial direction of the stator core 20 and press the stator core 20 respectively toward opposite sides in the circumferential direction of the stator core 20. Consequently, the pressing forces (or spring-back forces) applied by the bent parts 61 to the stator core 20 are canceled by each other, thereby preventing the magnetic steel sheets 20a from being circumferentially displaced by the pressing forces. As a result, it becomes possible to prevent deformation of the stator core 20 due to the pressing forces.

In the present embodiment, before being assembled to the stator core 20, each of the electric conductor segments 40 is substantially U-shaped to have the pair of straight portions 41 extending parallel to each other and the turn portion 42 connecting ends of the pair of straight portions on the same side (see FIG. 5). The length of the pair of straight portions 41 is greater than the axial length of the stator core 20. Each of the pair of straight portions 41 includes one of the pair of in-slot portions A1 of the electric conductor segment 40 and is twisted, on the second axial side (i.e., the lower side in FIGS. 6 and 7) of the stator core 20, to one side in the circumferential direction of the stator core 20 to form the oblique part 45. For each of the pair of straight portions 41, the bent part (or protruding part) 61 formed in the in-slot portion A1 of the straight portion 41 is bent (or protrudes) to the side in the circumferential direction to which the straight portion 41 is twisted.

With the above configuration, for each of the pair of straight portions 41, the in-slot portion A1 of the straight portion 41 is inserted in the corresponding slot 21 of the stator core 20 away from the corner portion of the stator core 20 which is on the second axial side of the stator core 20 and on the circumferential side of the straight portion 41 to which the straight portion 41 is twisted (see FIG. 7). Consequently, in twisting the straight portion 41 to form the oblique part 45, it is possible to prevent the straight portion 41 from making contact with the corner portion of the stator core 20, thereby preventing the insulation properties of the stator coil 30 from being lowered.

In the present embodiment, the slots 21 of the stator core 20, in which the in-slot portions A1 of the electric conductor segments 40 are inserted, are filled with the filler 62.

Consequently, with the filler 62, it is possible to more reliably suppress movement of the in-slot portions A1 of the electric conductor segments 40 in the corresponding slots 21 of the stator core 20. More particularly, in the present embodiment, since the in-slot portions A1 of the electric conductor segments 40 have the respective bent parts 61 formed therein, there are provided additional spaces in the corresponding slots 21 of the stator core 20. By filling the filler 62 into the additional spaces in the corresponding slots 21, it is possible to more reliably fix the in-slot portions A1 of the electric conductor segments 40 in the corresponding slots 21, thereby more reliably suppressing movement of the in-slot portions A1 in the corresponding slots 21.

In the present embodiment, in each of the slots 21 of the stator core 20, there are inserted an even number (e.g., eight)

of the in-slot portions A1 of the electric conductor segments 40 in radial alignment with each other. Each of the electric conductor segments 40 is configured so that a radially inward springback force is generated in one of the pair of in-slot portions A1 of the electric conductor segment 40 and a radially outward springback force is generated in the other of the pair of in-slot portions A1. More specifically, for each of the electric conductor segments 40, the pair of in-slot portions A1 (or straight portions 41) of the electric conductor segment 40 are radially offset from each other by twisting the turn portion 42 of the electric conductor segment 40 (see FIG. 5). Consequently, it becomes possible to generate both the circumferential springback force and the radial springback force in each of the in-slot portions A1 of the electric conductor segments 40, thereby more reliably suppressing movement of the in-slot portions A1 in the corresponding slots 21.

In addition, since both the circumferential and radial springback forces are generated in each of the in-slot portions A1 of the electric conductor segments 40, it is possible to suppress movement of the in-slot portions A1 in the corresponding slots 21 with the radial springback force reduced in comparison with the case where only the radial springback force is generated. Accordingly, in assembling the electric conductor segments 40 to the stator core 20, it is possible to suppress the assemblability from being lowered due to the radial springback force.

Second Embodiment

Figure 9A:
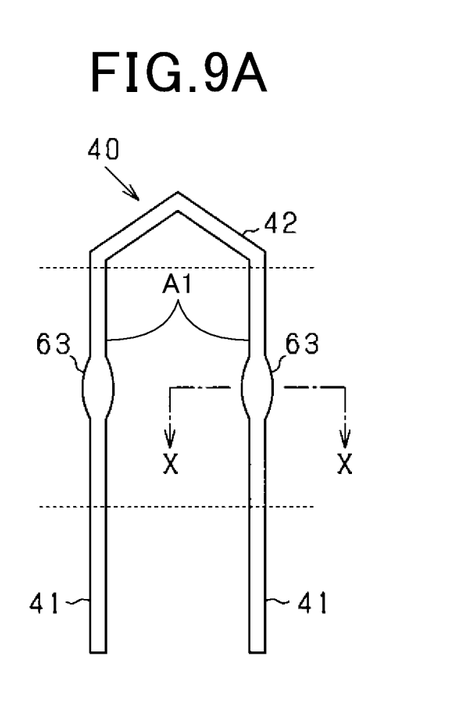
FIG. 9A is a plan view of one of electric conductor segments according to a second embodiment.
Figure 9B:
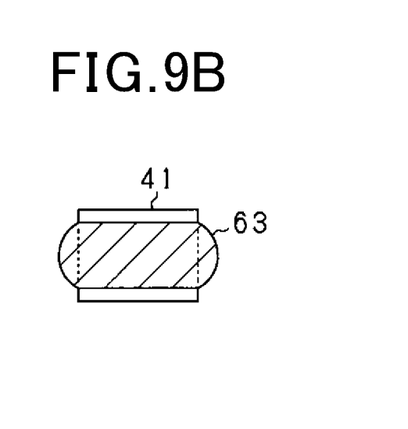
FIG. 9B is a cross-sectional view taken along the line X-X in FIG. 9A.

FIGS. 9A-9B show the configuration of electric conductor segments 40 according to a second embodiment.

In the present embodiment, each of the straight portions 41 (more specifically, the in-slot portions A1) of the electric conductor segments 40 includes, instead of the bent part 61 described in the first embodiment, a pair of protruding parts 63 that are formed by pressing and thereby flattening a part of the straight portion 41. More specifically, as shown in FIGS. 9A-9B, the part of the straight portion 41 is pressed, for example by a press machine, in a radial direction of the stator core 20, thereby forming the pair of protruding parts 63 that protrude from the remainder of the straight portion 61 respectively toward opposite sides in the circumferential direction of the stator core 20.

As described in the first embodiment, the electric conductor segments 40 are obtained by cutting and plastically deforming an electric wire that includes an electric conductor 51 having a substantially rectangular cross section and an insulating coat 52 covering the outer surface of the electric conductor 51. As shown in FIG. 9B, in forming the pair of protruding parts 63, the part of the straight portion 41 is pressed in a direction perpendicular to the longer sides of the substantially rectangular cross section of the electric conductor 51, thereby being expanded at the shorter sides of the substantially rectangular cross section. Moreover, at the pair of protruding parts 63, the electric conductor 51 is exposed from the insulating coat 52. In addition, the pair of protruding parts 63 taper respectively toward opposite sides in the circumferential direction of the stator core 20.

It should be noted that each of the straight portions 41 (more specifically, the in-slot portions A1) of the electric conductor segments 40 may include a plurality of pairs of protruding parts 63 that are respectively formed at a plurality of locations in the axial direction of the stator core 20.

With the electric conductor segments 40 according to the present embodiment, it is possible to achieve the same advantageous effects achievable with the electric conductor segments 40 according to the first embodiment.

While the above particular embodiments and modifications have been shown and described, it will be understood by those skilled in the art that various further modifications, changes, and improvements may be made without departing from the spirit of the present invention.

Figure 10:
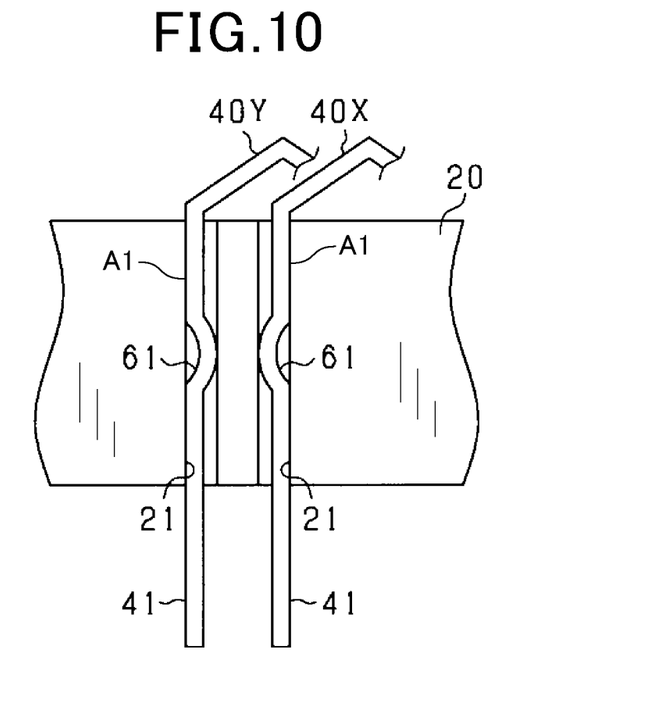
FIG. 10 is a schematic view illustrating two types of electric conductor segments according to a fourth modification in a state of having been inserted in the slots of the stator core.

For example, as shown in FIG. 10, the electric conductor segments 40 forming the stator coil 30 may include two types of electric conductor segments 40X and 40Y. The bent parts 61 formed in the in-slot portions A1 of the electric conductor segments 40X of the first type are located at the same position in the axial direction of the stator core 20 as the bent parts 61 formed in the in-slot portions A1 of the electric conductor segments 40Y of the second type. However, for each of the in-slot portions A1 of the electric conductor segments 40X of the first type, the circumferential side to which the bent part 61 formed in the in-slot portion A1 of the electric conductor segment 40X of the first type is bent is opposite to the circumferential side to which the bent part 61 formed in a corresponding one of the in-slot portions A1 of the electric conductor segments 40Y of the second type is bent. More specifically, the electric conductor segments 40X of the first type are configured as shown in FIG. 6. That is, for each of the electric conductor segments 40X of the first type, the bent parts 61 are respectively formed in the pair of in-slot portions A1 of the electric conductor segment 40X so as to protrude circumferentially outward of the substantially U-shape of the electric conductor segment 40X. On the other hand, the electric conductor segments 40Y of the second type are configured as shown in FIG. 8A. That is, for each of the electric conductor segments 40Y of the second type, the bent parts 61 are respectively formed in the pair of in-slot portions A1 of the electric conductor segment 40Y so as to protrude circumferentially inward of the substantially U-shape of the electric conductor segment 40Y.

Moreover, the electric conductor segments 40X of the first type are circumferentially offset from the electric conductor segments 40Y of the second type by one slot pitch. For each corresponding (or circumferentially-adjacent) pair of the in-slot portions A1 of the electric conductor segments 40X and 40Y of the first and second types, the apexes of the bent parts 61 formed in the corresponding pair of the in-slot portions A1 are opposed to each other. Consequently, the bent parts 61 formed in the corresponding pair of the in-slot portions A1 press the stator core 20 respectively toward opposite sides in the circumferential direction of the stator core 20. Consequently, the pressing forces (or springback forces) applied by the bent parts 61 to the stator core 20 are canceled by each other, thereby preventing the magnetic steel sheets 20a forming the stator core 20 from being circumferentially displaced by the pressing forces. As a result, it becomes possible to prevent deformation of the stator core 20 due to the pressing forces.

In the first embodiment, for each of the electric conductor segments 40, the bent parts (or protruding parts) 61 are respectively formed in the pair of in-slot portions A1 of the electric conductor segment 40 symmetrically with respect to the centerline T of the electric conductor segment 40 which extends through the center of the turn portion 42 of the electric conductor segment 40 (see FIG. 6).

However, for each of the electric conductor segments 40, the bent parts (or protruding parts) 61 may be respectively formed in the pair of in-slot portions A1 of the electric conductor segment 40 asymmetrically with respect to the centerline T of the electric conductor segment 40. For example, the bent parts 61 respectively formed in the pair of in-slot portions A1 of the electric conductor segment 40 may be located at different positions in the axial direction of the stator core 20. Moreover, the bent parts 61 respectively formed in the pair of in-slot portions A1 of the electric conductor segment 40 may be bent to the same side in the circumferential direction of the stator core 20. Furthermore, it is also possible to form the bent part 61 in only one of the pair of in-slot portions A1 of the electric conductor segment 40.

In the above-described embodiments, each of the electric conductor segments 40 has the substantially rectangular cross section. However, each of the electric conductor segments 40 may alternatively have, for example, a circular cross section.

In the first embodiment, the insulators 25, which are provided to electrically insulate the stator coil 30 (or the electric conductor segments 40) from the stator core 20, may be formed of a foamable resin material. More specifically, a sheet of the foamable resin material (or an insulating member consisting of an insulation sheet and the foamable resin material provided on the insulation sheet) may be arranged in each of the slots 21 of the stator core 20; then, each of the straight portions 41 of the electric conductor segments 40 may be inserted in a corresponding one of the slots 21 of the stator core 20 so as to be surrounded by the sheet of the foamable resin material arranged in the corresponding slot 21; thereafter, the foamable resin material may be foamed so that the sheet constitutes one of the insulators 25.

In the first embodiment, each of the slots 21 is configured as a partially-closed slot which is partially closed at the radially inner end thereof. In other words, each of the slots 21 partially opens on the radially inner surface of the stator core 20 (see FIG. 3).

However, each of the slots 21 may alternatively be configured as an open slot which fully opens on the radially inner surface of the stator core 20. Moreover, the stator core 20 may be comprised of a plurality of core segments. The slots 21 formed in the core segments may have a constant circumferential width. The electric conductor segments 40 may be joined to one another to form the stator coil 30 which has an annular shape. Then, the core segments may be assembled to the annular stator coil 30 from the radially outside.

In the above case where each of the slots 21 is configured as an open slot, the in-slot portions A1 of the electric conductor segments 40, which are received in the corresponding slots 21 of the stator core 20, may be displaced radially inward. However, by forming the bent parts 61 or the protruding parts 63 in the in-slot portions A1 of the electric conductor segments 40 as described in the first and second embodiments, it is possible to prevent the in-slot portions A1 received in the corresponding slots 21 from being displaced radially inward.

In the first embodiment, the present invention is directed to the stator 13 of the rotating electric machine 10 that is configured as an automotive alternator. However, the present invention can also be applied to stators of other rotating electric machines, such as a stator of an electric motor or a stator of a motor-generator that can selectively function either as an electric motor or as an electric generator.

What is claimed is:

1. A stator for a rotating electric machine, the stator comprising:
a stator core having a plurality of slots arranged in a circumferential direction thereof, the stator core being annular; and
a stator coil formed of a plurality of electric conductor segments mounted on the stator core, each of the plurality of electric conductor segments having a pair of in-slot portions and a turn portion, each of the pair of in-slot portions being inserted in a corresponding one of the plurality of slots of the stator core, the turn portion being located on one axial side of the stator core and connecting the pair of in-slot portions,
wherein
for each electric conductor segment of the plurality of electric conductor segments, at least one of the pair of in-slot portions of the each electric conductor segment includes a protruding part that protrudes, from other parts of the at least one of the pair of in-slot portions, in the circumferential direction of the stator core, and
in the plurality of slots of the stator core, a filler is provided, in addition to the in-slot portions of the plurality of electric conductor segments, the filler provided to fix the in-slot portions in the plurality of slots.

2. The stator as set forth in claim 1, wherein the protruding part is formed as a bent part that is bent in the circumferential direction of the stator core.

3. The stator as set forth in claim 2, wherein the stator core is formed of a plurality of steel sheets that are laminated in an axial direction of the stator core,
for the each electric conductor segment of the plurality of electric conductor segments, each of the pair of in-slot portions of the each electric conductor segment includes the bent part that is bent in the circumferential direction of the stator core, and
the bent parts of each of the pair of in-slot portions of the each electric conductor segment are respectively formed in the pair of in-slot portions symmetrically with respect to a centerline of the each electric conductor segment which extends through a center of the turn portion of the each electric conductor segment.

4. The stator as set forth in claim 2, wherein the stator core is formed of a plurality of steel sheets that are laminated in an axial direction of the stator core,
for the each electric conductor segment of the plurality of electric conductor segments, each of the pair of in-slot portions of the each electric conductor segment includes one bent part that is bent in the circumferential direction of the stator core,
the plurality of electric conductor segments comprise first and second types of electric conductor segments,
for each of the in-slot portions of the first type of the plurality of electric conductor segments, a circumferential side to which the bent part formed in the in-slot portion of the each of the first type of the plurality of electric conductor segments is bent is opposite to a circumferential side to which the bent part formed in a corresponding one of the in-slot portions of the second type of the plurality of electric conductor segments is bent, and
for each corresponding pair of the in-slot portions of the first type and the second type of electric conductor segments, the bent parts formed in the in-slot portions of the corresponding pair are located at a same position in the axial direction of the stator core.

5. The stator as set forth in claim 1, wherein the protruding part is formed by pressing a part of the in-slot portion of the each electric conductor segment in a radial direction of the stator core and thereby flattening the part of the in-slot portion.

6. The stator as set forth in claim 1, wherein before being assembled to the stator core, each of the plurality of electric conductor segments is substantially U-shaped to have a pair of straight portions extending parallel to each other and the turn portion connecting ends of the pair of straight portions,
  the pair of straight portions have a length greater than an axial length of the stator core,
  each of the pair of straight portions includes one of the pair of in-slot portions of the each electric conductor segment and is twisted, on an opposite axial side of the stator core to the turn portion, to one side in the circumferential direction of the stator core to form an oblique part, the oblique part extending obliquely with respect to an axial end face of the stator core, and
  for the at least one of the pair of in-slot portions of the each electric conductor segment, the protruding part protrudes to the side in the circumferential direction to which the straight portion that includes the in-slot portion is twisted.

7. The stator as set forth in claim 1, wherein in each of the plurality of slots of the stator core, there are inserted a given number of the in-slot portions of the plurality of electric conductor segments in alignment with each other in a radial direction of the stator core, and
  the each of the plurality of electric conductor segments is configured so that a radially inward springback force is generated in one of the pair of in-slot portions of the each electric conductor segment and a radially outward springback force is generated in the other of the pair of in-slot portions.

* * * * *

UNITED STATES PATENT AND TRADEMARK OFFICE
CERTIFICATE OF CORRECTION

PATENT NO.        : 10,574,106 B2
APPLICATION NO.   : 15/685044
DATED             : February 25, 2020
INVENTOR(S)       : Toshihiro Takei Page 1 of 1

It is certified that error appears in the above-identified patent and that said Letters Patent is hereby corrected as shown below:

On the Title Page

Item "(30) Foreign Application Priority Data":
Delete "August 24, 1999" and insert -- August 24, 2016 --, therefor.

Signed and Sealed this
Second Day of June, 2020

Andrei Iancu
*Director of the United States Patent and Trademark Office*